UNITED STATES PATENT OFFICE.

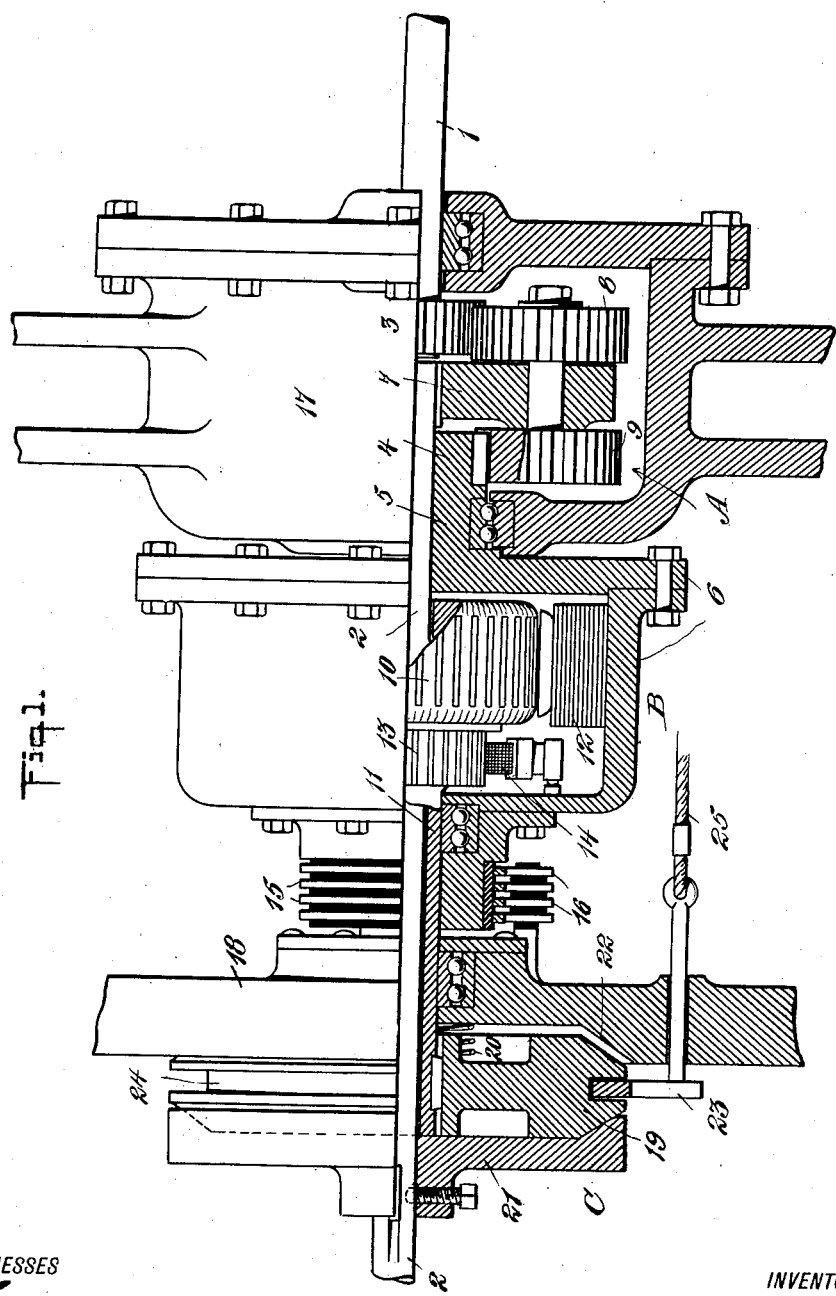

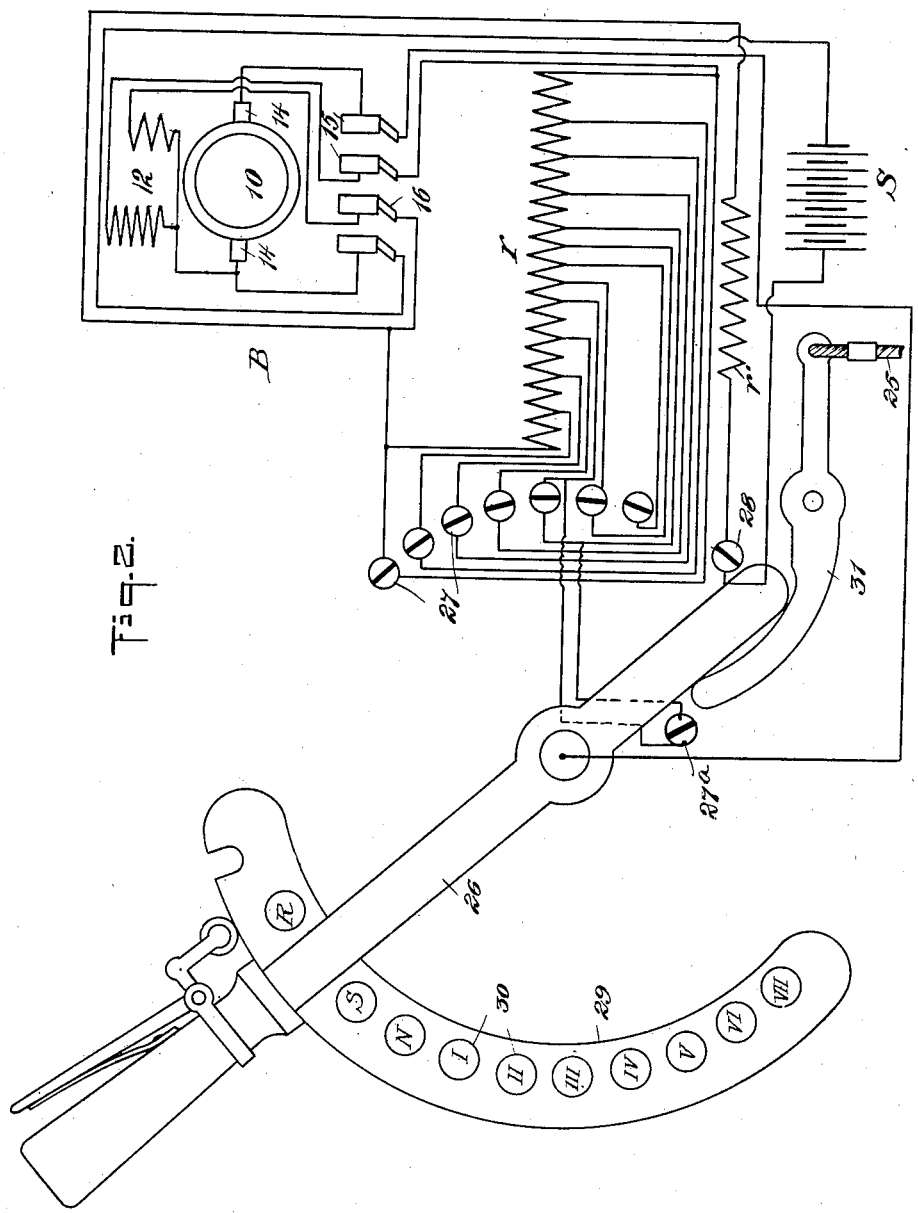

CARLOS M. SEIDEL, OF HABANA, CUBA.

DIFFERENTIAL MAGNETIC SPEED-CHANGING TRANSMISSION MECHANISM.

1,330,398. Specification of Letters Patent. Patented Feb. 10, 1920.

Application filed November 11, 1916. Serial No. 130,734.

*To all whom it may concern:*

Be it known that I, CARLOS M. SEIDEL, a citizen of the Republic of Cuba, and a resident of Habana, Cuba, have invented a new and Improved Differential Magnetic Speed-Changing Transmission Mechanism, of which the following is a full, clear, and exact description.

This invention relates to transmission mechanisms of that type disclosed in my Patent No. 1,289,935 of December 31, 1918, wherein the transmission between the engine shaft and road wheels of the vehicle comprises a differential gearing, a dynamo electric machine and clutches whereby various driving combinations can be obtained.

The general object of the present invention is to provide a novel combination of elements whereby the armature of the dynamo electric machine can be positively connected with the driven shaft for forward driving at any desired speed, according to the position of the electric controller for the dynamo electric machine, or whereby the armature can be held stationary while the driven shaft is driven in a reverse direction through the differential action of the differential gearing while the rotating field of the dynamo electric machine offers resistance to rotation.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in both the views, Figure 1 is a combined side elevation and sectional view of the transmitting mechanism; and Fig. 2 is a diagrammatic view of the electrical devices and circuits.

Referring to the drawings, 1 designates the engine shaft and 2 the driven or controller shaft of the vehicle, and between these shafts is a differential gearing A, a dynamo electric machine B, and a compound clutch C.

The differential gearing A comprises a gear 3 mounted on the engine shaft, a gear 4 connected with the hub 5 of the field frame or casing 6 of the electric machine B, a carrier 7, fastened to the driven shaft 2, and two sets of connected gears 8 and 9 mounted on the carrier 7 and meshing respectively with the gears 3 and 4.

The electric machine B comprises an armature 10 which is fastened to a sleeve 11 freely rotatable on the driven shaft 2, and surrounding the armature is the field frame 6 which has a plurality of energizing magnets 12. The commutator 13 of the armature has brushes 14 bearing thereon, and these brushes and the fields are connected in circuit with the source of current S, Fig. 2, by collector rings 15 and brushes 16. The field frame 6 is freely rotatable on the sleeve 11 and in the casing 17 of the differential gearing.

The driven shaft 2 is rotatably mounted in a stationary support 18 through which the sleeve 11 extends, and slidably mounted on and rotatable with this sleeve is the double clutch element 19 of the clutch C. This clutch element is normally pressed by a spring 20 into engagement with a hollow cone clutch element 21 fastened to the shaft 2. The stationary support 18 is formed to constitute a hollow clutch element 22 with which the slidable clutch element 19 can be engaged for holding the armature 10 stationary when it is desired to reverse the vehicle. The sliding clutch element 19 is actuated by any suitable means, such as a fork 23, which engages in the peripheral groove 24 of the said clutch element, the fork being connected by a cable or other suitable means 25 so that it can be actuated by the driver.

The transmission is controlled by a controlling lever 26, Fig. 2, which is conveniently positioned for the driver of the car, and this controller constitutes a movable contact which coöperates with the series of rheostat contacts 27 whereby more or less of the resistance $r$ can be cut into and out of circuit with the dynamo electric machine B. A starting resistance $r'$ can be thrown into and out of circuit by the lever 26 engaging the contact 28, whereby the electric machine can be used for starting the engine by causing the field frame of the electric machine B to rotate and transmit power through the differential gearing to the engine shaft 1, it being understood that the driven shaft 2 will be held stationary by the vehicle wheels engaging the road surface.

The controlling lever 26 moves over a segment 29 which has a series of points 30 thereon to guide the driver in manipulating the controller to and from its different positions. Associated with the lever 26 is a device, such as a lever 31, which operates the cable 25 when the controlling lever is moved to a position for reversing the direction of travel of the car.

In driving forwardly, the armature of the machine B is connected with the driven shaft through the elements 19 and 21 of the clutch C being engaged and the various speeds can be obtained by the electric controller for the machine B. When it is desired to reverse the direction of travel of the car the controller lever 26 is manipulated to disengage the clutch element 19 from the clutch element 21 and engage the element 19 with the clutch element 22, whereby the armature is held stationary and the shaft 2 is rotated in a reverse direction through the action of the differential gearing, the rotatable field element 6 of the electric machine B offering more or less resistance against rotation, as will be readily understood.

When the controlling lever 26 is in reversing position the electric machine is in closed circuit by means of the lever 26 engaging the contact 27$^a$, which is in parallel relation with one of the contacts 27 of the rheostat.

When the lever 26 is in the neutral position N or in the position shown in Fig. 2 the armature of dynamo 10 is on open circuit as will be seen by tracing the conductor 14—15—26. Hence at such time no electromagnetic reactions between the field and armature will be possible. When the handle is moved to position S for starting, then energizing shunt circuits for the field and armature are established as follows: for the armature 14—15—26—28—S—14; for the lower field winding on the diagram (Fig. 2), 14—15—26—28—$r'$—16—12—14; for the upper field winding on the same diagram 14—15—26—28—$r'$—27—12—14. The resistance $r$ lies between the two field windings, the conductive connection being traced through the points 16—$r$. The insulated right portions of contacts 27 are tapped to small portions of the left half of resistance $r$, all of which can be shunted off gradually from the lowermost field coils, and the left sides of contacts 27 are tapped to small portions of the right half of resistance $r$, all of which can be shunted off gradually from the uppermost field coils as the lever 33 is moved from position I to position VII.

When the handle is moved to position I the self-exciting circuits from the armature to both sets of field coils each comprise a full half portion of resistance $r$, but on position II a small middle portion of resistance $r$ will be simultaneously shunted off from said field coils, on position III a larger middle portion of resistance $r$ will be shunted out, and so on, till on position VII, all the resistance will be shunted out of these circuits and they will then be traced as follows: 14—15—26, upper contact 27 and branching from there through the two field coils to points 12 and 14.

Thus it will be seen that as the handle goes from position I to position VII, the resistance is reduced in the circuits of the field and armature, increasing the electromagnetic drag between them and tending to reduce the slip between them so that the shafts 1 and 2 will be rotating nearly together.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. In a transmission mechanism, the combination of a driving shaft, a driven shaft, an electric machine including independently rotatable armature and field elements, a differential gearing having its carrier connected with the driven shaft and its planets geared respectively with the driving shaft and one of the said elements, and means controllable at will for alternatively locking the other of said elements in fixed position, or locking it to the driven shaft.

2. In a transmission mechanism, the combination of a driving shaft, a driven shaft, an electric machine including independently rotatable armature and field members, a differential gearing having three elements namely a planet carrier and two sets of planets, one of said three elements being connected with the driving shaft, another with the driven shaft and the third with one of said members, and means controllable at will for connecting or disconnecting one and only one of the members of the electric machine with the driven shaft.

3. In a transmission mechanism, the combination of a driving shaft, a driven shaft, an electric machine including independently rotatable armature and field members, a differential gearing having three elements namely a planet carrier and two sets of planets, one of said three elements being connected with the driving shaft, another with the driven shaft and the third with one of said members, means controllable at will for connecting or disconnecting one of the members of the electric machine with the driven shaft, and means controllable at will for arresting the said element when disconnected from the driven shaft.

4. In a transmission mechanism, the combination of a driving shaft, a driven shaft, an electric machine including independently rotatable armature and field elements, a differential gearing operatively connected with the driving and driven shafts and with one of the said elements, means controllable at will for arresting rotation of the other of said elements, and a controller for the circuits of the electric machine and forming an actuator for the said means.

5. In a transmission mechanism, the combination of a driving shaft, a driven shaft, an electric machine including independently rotatable armature and field elements, a differential gearing operatively connected with the driving and driven shafts and with one of the said elements, means controllable at will for connecting or disconnecting one and only one of the elements of the electric machine with the driven shaft, and a controller for the circuits of the electric machine and forming an actuator for the said means.

6. In a transmission mechanism, the combination of a driving shaft, a driven shaft, an electric machine including independently rotatable armature and field elements, a differential gearing operatively connected with the driving and driven shafts and with one of the said elements, means controllable at will for alternatively connecting one of the elements of the electric machine with the driven shaft or disconnecting it therefrom and then arresting its motion, and a controller for the circuits of the electric machine and forming an actuator for the said means.

7. In a transmission mechanism, a driving shaft, a driven shaft, a dynamo electric machine comprising two members, a differential mechanism comprising two sun gears and planetary gears, the driving shaft being connected with one sun gear, the driven shaft carrying the planetary gears, one of said members carrying the other sun gear, and means to lock the other member to the driving shaft or in fixed position as desired.

8. In a transmission mechanism, a driving shaft connected to one of the sun gears of a differential gear mechanism, a driven shaft carrying the planetary gears of said mechanism, a member of a dynamo electric machine carrying the other sun gear of the differential mechanism, and means to lock the remaining member of said dynamo electric machine to the driven shaft or in a fixed position as desired.

9. In a transmission mechanism, a driving shaft, a driven shaft, differential gear mechanism connected with said shafts, a dynamo electric machine comprising two members, one of said members also being connected with said differential gear mechanism, and means to connect the other of said members to the driven shaft or to a fixed member as desired.

10. In a transmission mechanism, a driving shaft, a driven shaft, differential gear mechanism connected with said shafts, a dynamo electric machine comprising two members, one of said members also being connected with said differential gear mechanism, means to connect the other of said members to the driven shaft or to a fixed member as desired, and a stationary casing around said differential mechanism.

CARLOS M. SEIDEL.